2,726,155

TREATING VEGETABLE OIL-BEARING MATERIALS TO OBTAIN MEALS OF IMPROVED NUTRITIVE VALUE

William H. King, Francis H. Thurber, and Aaron M. Altschul, New Orleans, La., assignors to the United States of America as represented by the Secretary of Agriculture No Drawing. Application April 16, 1954,
Serial No. 423,863

6 Claims. (Cl. 99—2)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the processing of vegetable oil-bearing materials, particularly soybean and cottonseed meats, and provides a process of heat treating them to obtain meals of improved nutritive value.

Heretofore the vegetable oil-bearing materials have been heat treated prior to their oil extraction for different reasons. For example, the materials are often subjected to a very short mild heat treatment, "heat tempering" to improve the manner in which they pass through cracking or flaking rolls and to improve the flakes that can be obtained. Materials such as cottonseed which contain toxic substances are sometimes heat treated to destroy or detoxify the toxic substances. Particularly where the oil is to be extracted by a pressing-out operation, vegetable oil-bearing materials are usually heat treated to coalesce their oil and to improve the ease of the oil extraction. In addition, recent solvent extraction processes, such as the so-called "filtration-extraction" and "pre-press" solvent extraction processes, have indicated the advantage of a heat conditioning treatment prior to a solvent extraction. It has long been believed that substantially any heating of a vegetable oil-bearing material, particularly in the presence of moisture, damages protein, as indicated by a lowered soluble nitrogen content and a lowered nutritive value of the meals yielded by heat treated materials. Consequently, the heat treatments heretofore employed have either involved an intentional lowering of the nutritive value of the meals obtainable in order to accomplish detoxification and the like; or have required a very careful control of temperature, moisture content and time to strike a compromise resulting in some useful improvement of properties by means of the heat treatment without inducing too much protein damage.

We have discovered that, if the moisture content of the vegetable oil-bearing material, particularly soybean and cottonseed meats, is adjusted to a relatively high moisture content and the pH of the material is adjusted, by the incorporation of an acid or a base, to a value which lies between approximately 4 and 9.5 and which differs from the natural pH of the material by at least 0.5 pH units; when the moisture content and pH adjusted materials are subjected to moderately elevated temperatures for a moderately short time, the heat treated materials exhibit the advantageous properties usually gained from a heat treatment, and—surprisingly—the soluble nitrogen content is increased, rather than decreased, and the nutritive value of the meal yielded by the heat treated material is increased, rather than decreased.

A possible theoretical explanation of this discovery is that, under the above conditions, certain chemical bonds, that reduce the availability of the proteins, which bonds may either be bonds within the protein molecules or bonds between the proteins and other components of the oil-bearing materials, are ruptured in the course of the heat treatment.

The above heat treatment succeeds in improving the nutritive value of the meal above that of a meal obtained by a careful removal of oil and interfering substances, e. g. gossypol in cottonseed and toxic materials in soybean, with minimum use of heat. In the present invention the heat is not applied in the usual sense, i. e. a factor to be controlled so as to minimize heat damage; but, instead, is applied in combination with acid or alkali, as a factor to improve the nutritive value of the meals above any levels hitherto obtained.

A primary object of the present invention is to provide a process of treating vegetable oil-bearing materials, particularly soybean and cottonseed meats, to cause them to yield meals of improved nutritive value. A further object is to provide a process of improving the oil extraction characteristics of vegetable oil-bearing materials, particularly soybean and cottonseed meats, by means of a heat treatment which increases the soluble nitrogen content and causes the materials to yield means having an improved nutritive value. Other objects and advantages of the invention will be apparent from the following descriptions and claims.

In accordance with this invention, the vegetable oil-bearing materials in the form of meats, particularly soybean and cottonseed meats, and preferably in flaked form, are adjusted to a moisture content of from 20 to 50%, and by the incorporation of a water soluble acid or base, the pH of the material is adjusted to a value which lies between about 4 and 9.5 and which differs from the natural pH of the material by at least 0.5 pH units, and the moisture and pH and adjusted meats are dehydratively heated at from about 60 to 225° F. for from about 20 to 40 minutes until their moisture content is reduced to from about 7 to 13%, with the temperature kept below about 200° F. for from about 10 to 20 minutes, and with the heating being conducted in a deheydrative atmosphere until the moisture content is reduced to at least about 13%.

When incorporated into the usual processes of preparing vegetable seed and nut meats for oil extraction, the processes of this invention co-act with the steps of the usual preparation processes to produce advantageous new results. In the usual meat preparation processes, the meats are comminuted to particles of a suitable size, adjusted in moisture content and heat treated, to enhance the coalescence of the oil to aid in the extraction of the oil. The incorporation of the present process adds to this the very important new result of increasing the nutritive value of the meal produced.

The hull content of the meats can suitably vary over relatively wide ranges. Meats in the form of flakes, prepared by the usual decortication, cracking and flaking procedures, varying in thickness from about 0.010 to 0.040" in thickness, are suitable for this process.

The moisture content of the vegetable oil-bearing materials are preferably adjusted by mixing the materials with an aqueous liquid as soon as they have been dehulled and comminuted to relatively small particles. The mixing can suitably be accomplished by immersing the materials in the aqueous liquid or spraying the aqueous liquid onto the materials, as long as the materials and the liquid are agitated enough to obtain a substantially uniform mixture.

Illustrative examples of aqueous liquids which can suitably be used to adjust the moisture content and pH of vegetable oil-bearing material meats, include: dilute aqueous inorganic bases such as water solutions containing from about 1 to 10% of a water soluble base such as an alkali metal hydroxide, ammonium hydroxide, alkaline earth metal hydroxides, alkali metal carbonates or bicarbonates and the like; and dilute aqueous inorganic acids such as 1 to 10% phosphoric, sulfuric, hydrochloric and the like acids.

Where desirable the aqueous liquids can contain or be mixed with dilute aqueous solutions or dispersions of one or more compounds capable of reacting with gossypol and/or other components of the meats, including: oxidizing and reducing agents such as hydrogen peroxide and sodium sulfite; amines and amino acids such as aniline, glycine, p-aminobenzoic acid, ethanolamine; organic solvents such as alcohols and ketones and esters; and mechanical adsorbents such as alcohols and ketones and esters; and mechanical adsorbents such as aluminum hydroxide gel and silica gel. Where the aqueous liquid contains a reactive component, the concentration of that component is preferably based upon the amount of the ingredients of the meats with which it will react.

The adjustment of the pH can suitably be conducted prior to, concurrent with, or subsequent to the adjustment of the moisture content of the vegetable oil-bearing materials. The adjustment of the pH is preferably conducted concurrently with the adjustment of the moisture content by measuring the normal pH and moisture content of the material, dissolving the amount of acid or base needed to produce the adjusted pH in the amount of aqueous liquid needed to produce the adjusted moisture content, and mixing the vegetable oil-bearing materials with the resultant solution.

Cottonseed meats contain gossypol and related pigments in small, oval shaped glands. The gland walls are relatively tough and protect the pigments, chiefly gossypol, so that they remain in an uncombined or "free" state. This "free gossypol" is somewhat toxic to nonruminants and thus cottonseed products containing it can be fed to chickens and swine in only limited amounts.

In the case of oil-bearing materials such as cottonseed, the process of the present invention can advantageously be combined with the process described in copending patent application, Serial No. 373,926 filed August 12, 1953. By means of the combined process, cottonseed meats, containing gossypol bound to the solid components of cottonseed, and, yielding meals of unusually high nutritive value, can readily be produced. These particularly valuable cottonseed meats are produced by adjusting the moisture content and pH of cottonseed meats in accordance with the present invention, subjecting the moisture content and pH adjusted meats to the severe mechanical action more fully described in the above copending application and in Examples 2 and 3 hereinafter, and, while continuing the mechanical action, subjecting the meats to a mild dehydrative heating in accordance with the present invention. This combined process can advantageously be used in the treatment of substantially any oil-bearing material where it is desirable to insure a rather complete alteration of substantially all of the protein.

As described in the said copending application, the said severe mechanical action can be obtained by a wide variety of mixing devices. As an example of such a suitable device is a Hobart model C–10 food mixer in which the provided flat beater attachment has had its edges sharpened and in which the mixing vessel also provided has been modified by the insertion of baffles large enough to contact the outer edges of the beater in each quarter of the vessel. Such a mixer can furnish the specified mechanical agitation when driven at its designed speed.

The "severe mechanical action," which constitutes an essential element of the invention described and claimed in the above copending application, comprises; subjecting a mixture of cottonseed particles and enough of an aqueous liquid to increase the moisture content of the particles to from about 20 to 50% to a sustained and violent intermingling without comminution into a mass of fine particles. In this mechanical action, the mixture of cottonseed meats and the liquid becomes a relatively sticky and dough-like mass as the meat particles absorb the liquid. The severe mechanical action, in conjunction with the action of water, ruptures the pigment glands. During the mild dehydrative heating, the intermingling of the particles insures reaction of substantially all of the gossypol, and, as the particles lose moisture, the continued mechanical action converts the dough-like mass of particles to discrete cottonseed particles which are impregnated with a cottonseed oil that is in a substantially continuous oil phase.

The following examples are illustrative of details of the invention. The term "parts" refers to parts by weight.

*Example 1.—Soybeans with alkali*

A sample of 3500 parts of soybean flakes having a moisture content of 7% and a pH of 6.3 is prepared from soybeans by conventional decorticating and flaking procedures which do not alter the natural moisture content or pH. The flakes are mixed with 1220 parts of a solution of 22 parts of alkali in water, to produce moisture and pH adjusted soybean flakes. The moisture and pH adjusted flakes are heated for about 20 minutes in a dehydrative atmosphere causing the temperature of the flakes to rise slowly to a temperature of about 125° F. The rate of heating is then increased causing the temperature of the material to rise to a final temperature of 212° F. in approximately 30 minutes.

*Example 2.—Cottonseeds with alkali*

A sample of 3500 parts of cottonseed flakes having a moisture content of 7% and a pH of 6.3 is prepared from cottonseed by conventional decorticating and flaking procedures which do not alter the natural moisture content or pH. The flakes are mixed with 1220 parts of a solution of 22 parts of alkali in water, to produce moisture and pH adjusted cottonseed flakes. The moisture and pH adjusted flakes are agitated in a Hobart model C–10 food mixer which is driven at its designed speed using the provided flat beater attachment with the edges sharpened, and using also the provided mixing vessel with baffles large enough to contact the outer edges of the beater inserted in each quarter of the vessel. The flakes are then heated for about 20 minutes in a dehydrative atmosphere causing the temperature of the flakes to rise slowly to a temperature of about 125° F. The rate of heating is then increased causing the temperature of the material to rise to a final temperature of 212° F. in approximately 30 minutes.

*Example 3.—Cottonseeds with acid*

A sample of 3500 parts of cottonseed flakes having a moisture content of 7% and a pH of 6.3 is prepared from cottonseed by conventional decorticating and flaking procedures which do not alter the natural moisture content or pH. The flakes are mixed with 1220 parts of a solution of 30 mls. of 85% phosphoric acid in water, to produce moisture and pH adjusted cottonseed flakes. The moisture and pH adjusted flakes are agitated in a Hobart model C–10 food mixer which is driven at its designed speed using the provided flat beater attachment with the edges sharpened, and using also the provided mixing vessel with baffles large enough to contact the outer edges of the beater inserted in each quarter of the vessel. The flakes are then heated for about 20 minutes in a dehydrative atmosphere causing the temperature of the flakes to rise slowly to a temperature of about 125° F. The rate of heating is then increased causing the temperature of the material to rise to a final temperature of 212° F. in approximately 30 minutes.

We claim:

1. A process comprising adjusting the moisture content of vegetable meats selected from the group consisting of soybean meats and cottonseed meats to from about 20 to 50% and adjusting the pH of the meats, by the incorporation of a water soluble compound selected from the group consisting of acids and bases, to a value which lies between about 4 and 9.5 and which differs from the natural pH of the materials by at least 0.5 pH units and, dehydratively heating the moisture and pH adjusted meats at from about 60 to 225° F. for from about 20 to 40 minutes until their moisture content is reduced to from about 7 to 13%, with the temperature being kept below about 200° F. for from about 10 to 20 minutes, and with the heating being conducted in a dehydrative atmosphere until the moisture content is reduced to at least about 13%.

2. The process of claim 1 in which the meats are soybean meats.

3. The process of claim 2 in which the pH is adjusted by the incorporation of an alkali metal hydroxide.

4. The process of claim 1 in which the meats are cottonseed meats.

5. The process of claim 4 in which the pH is adjusted by the incorporation of an alkali metal hydroxide.

6. The process of claim 4 in which the pH is adjusted by the incorporation of phosphoric acid.

References Cited in the file of this patent

UNITED STATES PATENTS

| | | |
|---|---|---|
| 1,278,075 | Phillips | Sept. 3, 1918 |
| 1,515,947 | Hall | Nov. 18, 1924 |